US010363808B2

(12) United States Patent
Uozumi et al.

(10) Patent No.: US 10,363,808 B2
(45) Date of Patent: Jul. 30, 2019

(54) WHEEL DRIVE MOTOR AND IN-WHEEL MOTOR DRIVE ASSEMBLY

(71) Applicant: NTN CORPORATION, Osaka (JP)

(72) Inventors: Tomohisa Uozumi, Shizuoka (JP); Masaru Kuroda, Shizuoka (JP); Kenichi Suzuki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 89 days.

(21) Appl. No.: 15/116,521

(22) PCT Filed: Jan. 27, 2015

(86) PCT No.: PCT/JP2015/052203
§ 371 (c)(1),
(2) Date: Aug. 4, 2016

(87) PCT Pub. No.: WO2015/125568
PCT Pub. Date: Aug. 27, 2015

(65) Prior Publication Data
US 2016/0355084 A1 Dec. 8, 2016

(30) Foreign Application Priority Data

Feb. 18, 2014 (JP) .................................. 2014-028494
Jan. 13, 2015 (JP) .................................. 2015-003903

(51) Int. Cl.
*B60K 7/00* (2006.01)
*H02K 1/30* (2006.01)
*H02K 1/32* (2006.01)
*H02K 9/19* (2006.01)
(Continued)

(52) U.S. Cl.
CPC ............ *B60K 7/0007* (2013.01); *B60B 27/00* (2013.01); *B60K 17/043* (2013.01); *H02K 1/30* (2013.01);
(Continued)

(58) Field of Classification Search
CPC .................................................... B60K 7/0007
See application file for complete search history.

(56) References Cited

U.S. PATENT DOCUMENTS 7,350,605 B2 * 4/2008 Mizutani .............. B60K 7/0007
180/65.1
9,914,349 B2 * 3/2018 Kuroda .................. B60K 17/14
(Continued)

FOREIGN PATENT DOCUMENTS

CN 102548783 7/2012
CN 102905922 1/2013
(Continued)

*Primary Examiner* — James A Shriver, II
*Assistant Examiner* — James J Triggs
(74) *Attorney, Agent, or Firm* — Clark & Brody

(57) ABSTRACT

The wheel drive motor according to the invention includes a motor shaft (35) having a large diameter portion (35*d*) located at a central part in the axial direction and a small diameter portion (35*b*) located on a first side in the axial direction, a bearing (36*b*) rotatably supporting the small diameter portion (35*b*), and a rotor (24) secured to an outer circumferential surface (35*j*) of the large diameter portion (35*d*). An end part (24*p*) of the rotor (24) located on the first side in the axial direction projects over an end face (35*e*) of the large diameter portion (35*d*) located on the first side in the axial direction toward the side on which the small diameter portion (35*b*) is.

8 Claims, 5 Drawing Sheets

(51) Int. Cl.
  *B60B 27/00* (2006.01)
  *B60K 17/04* (2006.01)
  *H02K 7/08* (2006.01)
  *H02K 7/00* (2006.01)
  *H02K 7/116* (2006.01)

(52) U.S. Cl.
  CPC ............... *H02K 1/32* (2013.01); *H02K 7/006* (2013.01); *H02K 7/08* (2013.01); *H02K 7/116* (2013.01); *H02K 9/19* (2013.01); *H02K 2213/03* (2013.01); *Y02T 10/641* (2013.01)

(56) References Cited

U.S. PATENT DOCUMENTS

2014/0031160 A1* 1/2014 Suzuki ................... H02K 7/116
                                                                475/149
2014/0353056 A1* 12/2014 Hirano ................. B60K 7/0007
                                                                180/65.51
2016/0167505 A1* 6/2016 Suzuki ................. B60K 7/0007
                                                                180/65.51

FOREIGN PATENT DOCUMENTS

| | | |
|---|---|---|
| DE | 10 2011 079164 | 1/2013 |
| EP | 2 487 060 | 8/2012 |
| JP | 2002-281720 | 9/2002 |
| JP | 2005-318679 | 11/2005 |
| JP | 2006-158005 | 6/2006 |
| JP | 2009-063043 | 3/2009 |
| JP | 2010-110110 | 5/2010 |
| JP | 2011-188541 | 9/2011 |
| JP | 2012-066602 | 4/2012 |
| JP | 2012-148725 | 8/2012 |
| JP | 2013-126280 | 6/2013 |

* cited by examiner

WHEEL DRIVE MOTOR AND IN-WHEEL MOTOR DRIVE ASSEMBLY

TECHNICAL FIELD

The present invention relates to a wheel drive motor that is built in an in-wheel motor drive assembly or in other drive assemblies to drive a wheel.

BACKGROUND ART

As a conventional well-known wheel drive motor for driving a wheel, for example, disclosed are in-wheel motor drive assemblies in Japanese Unexamined Patent Application Publication Nos. 2012-148725 (PTL 1) and 2009-063043 (PTL 2). FIG. 5 shows an in-wheel motor drive assembly 101 as disclosed in PTL 1 and PTL 2, that is mainly composed of a motor section 101A including a motor, a speed reducing section 101B including a cycloid reducer, and a wheel hub bearing section 101C rotatably supporting a wheel hub 108. The motor section 101A has a motor casing 102 that rotatably supports opposite end parts 103a, 103c of a motor shaft 103 using rolling bearings 104, 105. A hollow cylindrical rotor 106 is fixedly coupled on an outer circumferential surface at a central part 103b of the motor shaft 103. An outer circumferential surface of the rotor 106 faces an inner circumferential surface of a stator 107 that is secured along an inner circumference of the motor casing 102. The rotational speed of the motor shaft 103 is reduced by the cycloid reducer (speed reducing section 101B) at a high reduction rate over 1/10 to drive the wheel hub 108. Thus, the cycloid reducer is advantageous over general speed reducers, such as a planetary gear speed reducer and a parallel gear speed reducer, for its compactness and high reduction rate.

The motor shaft 103, rotor 106, and bearings 104, 105 are taken out from FIG. 5 to show them in FIG. 6 at an enlarged scale. The minimum length Ls required for the motor shaft 103 is the sum of an axial dimension $L_1$ required to support the end part 103a of the motor shaft 103, an axial dimension $L_2$+Lf of the central part 103b of the motor shaft 103, an axial dimension $L_3$ required to support the end part 103c of the motor shaft 103, a distance Lp between the end part 103a and the central part 103b, and a distance Lq between the central part 103b and the end part 103c (Ls=$L_3$+Lq+$L_2$+Lf+Lp+$L_1$).

CITATION LIST

Patent Literature

PTL1: Japanese Unexamined Patent Application Publication No. 2012-148725
PTL2: Japanese Unexamined Patent Application Publication No. 2009-063093

SUMMARY OF INVENTION

Problem to be Solved by the Invention

However, the inventors of this invention have discovered that the aforementioned conventional in-wheel motor drive assemblies still have issues to be improved. Firstly, the in-wheel motor drive assembly designed to be placed in a road wheel of a wheel preferably should entirely fit inside the road wheel without any end parts thereof sticking out of the road wheel. To this end, the bearing span, which is a distance between the bearings that support opposite ends of the motor shaft, is required to be shortened. On the other hand, motor torque changes with the size of the motor. It is difficult to increase the radial size of the motor under the constraint that the motor needs to fit inside the road wheel, but the axial size of the motor should be extended to provide a required torque. Thus, referring to FIG. 6, the axial length Ls of the motor shaft 103 is required to be shorter in terms of arrangement; however, it is difficult to shorten the bearing span between the bearings, which rotatably support the opposite ends of the motor shaft, to provide the required torque.

Secondly, the speed of a vehicle (automobile) equipped with the in-wheel motor drive assembly changes from 0 km/h to a high speed range more than 100 km/h. With the change of the speed, the rotational frequency of the motor shaft of the in-wheel motor drive assembly widely changes within a range from 0 to several tens of thousands [min$^{-1}$]. Focusing on a suspension device to which the in-wheel motor drive assembly is attached, it is appreciated from FIG. 7 that vibrations within the audible range and in-vehicle noise occur at the points (encircled areas S and S') where a resonant frequency (range R) around the suspension device is intersected with a rotation n-th order forced vibration component and a rotation (n+α)-th order forced vibration component, thereby possibly causing discomfort to the vehicle's occupants. In order to improve the quietness (noise, vibration, harshness (NVH) characteristics) of the vehicle equipped with the in-wheel motor drive assembly, it is important to control the rotation n-th order forced vibration component that is an origin of all vibrations including the rotation 1st order forced vibration component. However, the control measures against vibrations including the rotation 1st order forced vibration component have not been fully taken into consideration for the conventional in-wheel motor drive assemblies, and are still susceptible to improvement.

The third possible improvement is to place a bearing for the motor shaft inside the hollow cylindrical rotor to shorten the bearing span. Specifically, the motor shaft has a cylindrical outer circumference at a central part thereof (hereinafter, referred to as a large diameter portion's outer circumferential part), with which the inner circumferential surface of the rotor fits, and the large diameter portion has an annular space at an end thereof. In the annular space of the large diameter portion, arranged is an outer circumference situated at an end part of the motor shaft (hereinafter, referred to as a small diameter portion's outer circumferential part), with which an inner ring member of the bearing fits. In this case, however, the motor shaft in a grinding process needs two chucking operations to grind the small diameter portion's outer circumferential part and the large diameter portion's outer circumferential part, but it is impossible to grind both the outer circumferential parts at the same time. In other words, since the axial position of the small diameter portion's outer circumferential part coincides with the axial position of the large diameter portion's outer circumferential part, the grinding process requires firstly to chuck a predetermined part of the motor shaft to grind the small diameter portion's outer circumferential part, and then to rechuck another part of the motor shaft to grind the large diameter portion's outer circumferential part. The two chucking operations may cause a loss of concentricity between the small diameter portion's outer circumferential part and the large diameter portion's outer circumferential part.

Fourthly, it is conceivable to use a special grindstone insertable into an interior space of the large diameter portion to grind the small diameter portion's outer circumferential part without rechecking; however, such a special grindstone may drive up administrative costs.

The present invention has been made in view of the aforementioned circumstances and has an object to provide a wheel drive motor capable of shifting the forced vibration components of the motor shaft, providing necessary motor torque with a shortened bearing span, and allowing to grind the small diameter portion's outer circumferential part and large diameter portion's outer circumferential part without using a special grindstone and rechucking the motor shaft.

Solution to Problem

To achieve the object, a wheel drive motor according to the present invention includes a motor shaft for outputting drive force to rotate a wheel which extends in an axial direction and includes a large diameter portion located at a central part in the axial direction and a small diameter portion located on a first side in the axial direction, a bearing rotatably supporting the small diameter portion, and a rotor secured to an outer circumferential surface of the large diameter portion and facing a stator. An end part of the rotor located on the first side in the axial direction projects over an end face of the large diameter portion located on the first side in the axial direction toward the side on which the small diameter portion is.

According to the invention, the axial dimension of the rotor can be made greater than the axial dimension of the large diameter portion of the motor shaft. This can ensure sufficient motor torque without changing the axial dimension of the rotor, while shortening the bearing span of the motor shaft by reducing the axial dimension of the large diameter portion, thereby improving the aforementioned first issue. In addition, in a grinding process of the motor shaft, the outer circumferential surface of the large diameter portion and the outer circumferential surface of the small diameter portion can be ground through a single chucking operation without rechucking the motor shaft, thereby maintaining coaxiality between the central axis of the large diameter portion, which serves as a mass part of the motor shaft, and the central axis of the small diameter portion, which serves as a bearing part of the motor shaft, to adjust the balance of the rotational element (motor shaft). This reliable balance adjustment of the rotational element (motor shaft) results in reduction of absolute values of the rotation n-th order forced vibration component, which is a vibration source, and rotation (n+α)-th order forced vibration components. Consequently, the aforementioned second issue is addressed, and the NVH characteristics regarding discomfort to the vehicle's occupants are improved.

In the grinding process for the motor shaft, the outer circumferential surfaces of the large diameter portion and small diameter portion can be ground through a single chucking operation without rechucking the motor shaft. The grinding process can be carried out with a general cylindrical grindstone. Thus, the aforementioned third and fourth issues are improved, and the small diameter portion's outer circumference and large diameter portion's outer circumference can be formed without losing their concentricity, which is advantageous in accuracy and manufacturing cost.

The large diameter portion according to the present invention is set to be greater in diameter than the small diameter portion, and in a more preferable embodiment, the large diameter portion has an outer diameter greater than the outer diameter of the bearing, and the end part of the rotor projects over an end part of the bearing located on a second side in the axial direction toward the side on which the small diameter portion is. According to the embodiment, the axial position of the bearing overlaps with the axial position of the end part of the rotor, therefore shortening the bearing span of the motor shaft.

In a preferred embodiment of the present invention, the outer circumferential surface of the large diameter portion includes a large diameter portion's fitting surface that fits with a radially inner part of the rotor, and the small diameter portion has on its outer circumference a small diameter portion's fitting surface that fits with an inner ring member of the bearing. The positions of the large diameter portion's fitting surface and the small diameter portion's fitting surface are adjacent to each other, but do not overlap with each other in the axial direction. More preferably, the axial positions of the large diameter portion's fitting surface and the small diameter portion's fitting surface are arranged contiguously without an axial gap. The axial positions of the large diameter portion's fitting surface and the small diameter portion's fitting surface may overlap in part with each other in another embodiment; however, such large diameter portion's fitting surface and small diameter portion's fitting surface need to be individually ground through two chucking operations involving rechucking of the motor shaft, or the small diameter portion's fitting surface needs to be ground with a special grindstone, in whichever case, there are disadvantages in accuracy and manufacturing costs.

In a still preferable embodiment of the present invention, the wheel drive motor further includes an end member that is fixedly attached to the large diameter portion and projects from the end face of the large diameter portion located on the first side in the axial direction to cover an end face of the rotor located on the first side in the axial direction. According to the embodiment, the end member can reliably secure the rotor to the large diameter portion so as to prevent the rotor from moving. The end member is fully helpful only at one axial end of the large diameter portion, while a flange part is formed on the other axial end of the large diameter portion. Alternatively, the end member can be fixedly attached to both the axial ends of the large diameter portion.

The present invention is not limited to the embodiments, and the end member is positioned to be coaxial with the motor shaft at an attachment position on the large diameter portion, and the end member can have an outer circumferential fitting surface that fits with a radially inner part of the end part of the rotor located on the first side in the axial direction.

In an embodiment of the present invention, the wheel drive motor may further include an edge member having a lubricating oil passage between the end member and the end face of the rotor located on the first side in the axial direction. According to the embodiment, the interior of the motor can be lubricated.

In an embodiment, an in-wheel motor drive assembly can be made up with the wheel drive motor according to the invention, a speed reducing section having an input shaft coupled to the motor shaft and an output shaft reducing the rotational speed of the input shaft and outputting it, and a wheel hub bearing section including a wheel hub coupled to the output shaft.

Advantageous Effects of Invention

According to the present invention, the in-wheel motor drive assembly can be housed in the hollow area of the road wheel without great difficulty, and the wheel drive motor can fit in a narrow and small wheel housing and can be even installed in automobiles having severe layout constraints. Also, in the grinding process of the motor shaft, the outer circumferential surfaces of the large diameter portion and small diameter portion can be ground through a single chucking operation without rechucking the motor shaft. Besides, this invention eliminates the necessity of special grindstones, and therefore the outer circumferential surfaces of the small diameter portion and large diameter portion of the motor shaft can be ground by a general cylindrical grindstone.

DESCRIPTION OF EMBODIMENT

Figure 1:
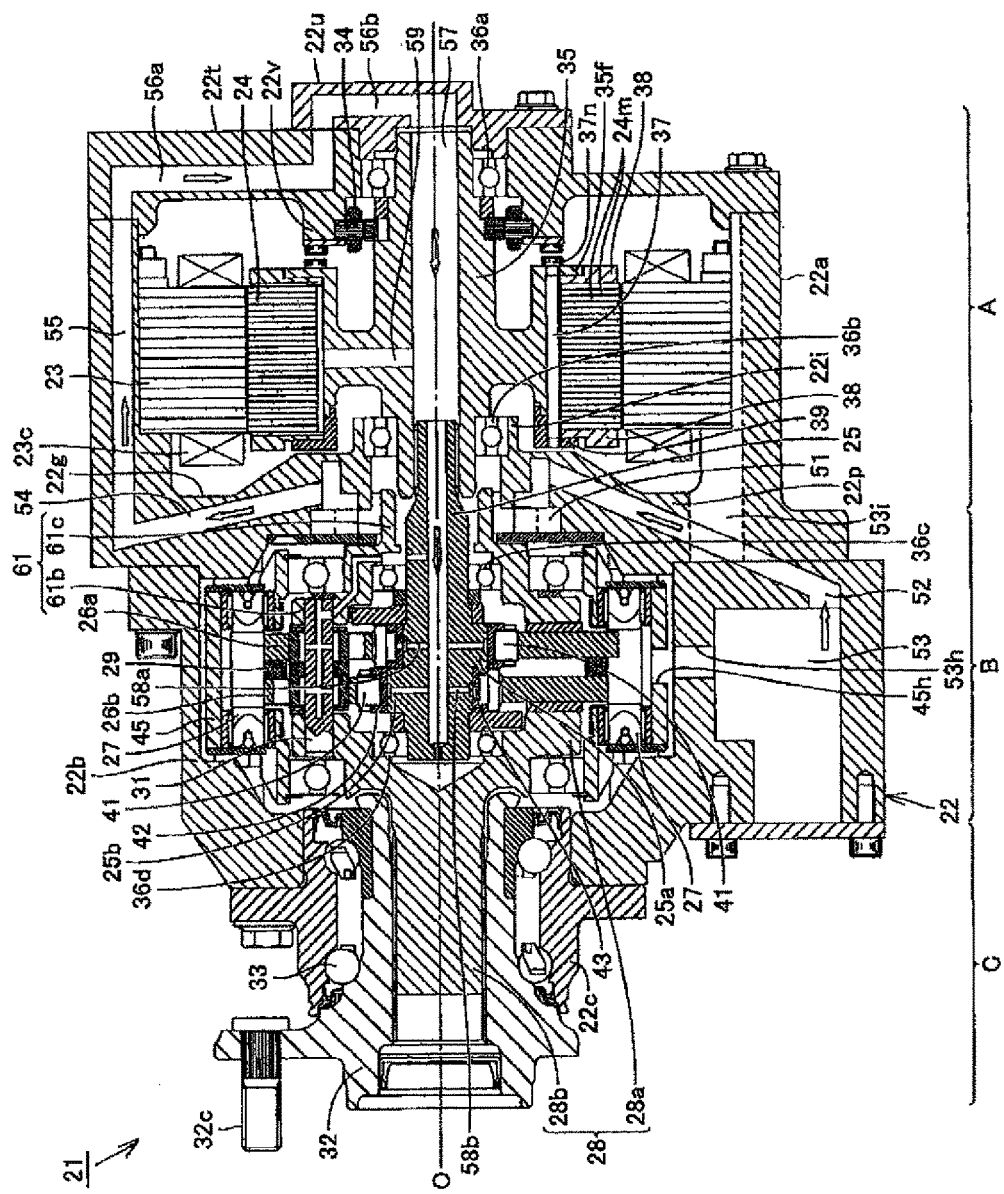
FIG. 1 is a vertical cross-sectional view of an in-wheel motor drive assembly adopting a wheel drive motor according to an embodiment of the present invention.
Figure 2:
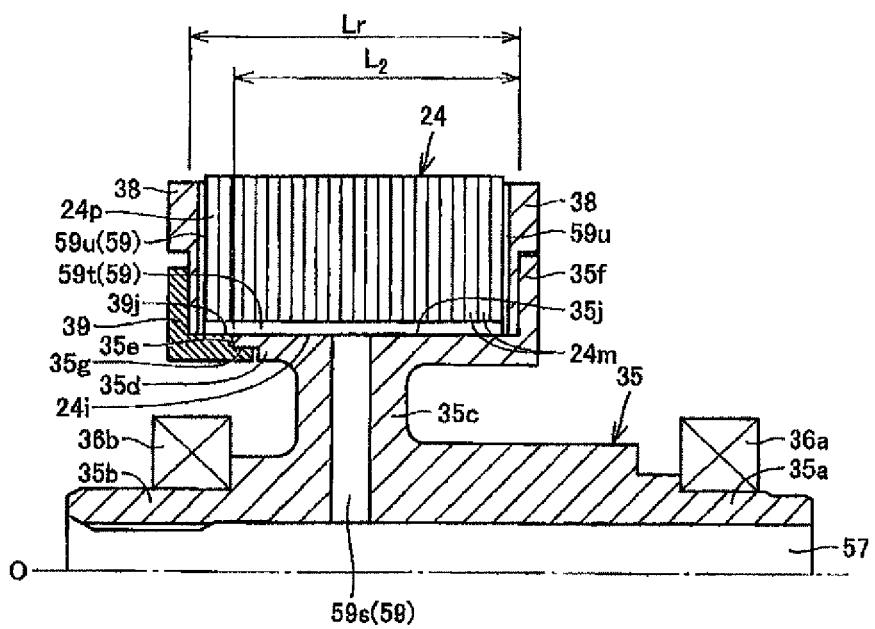
FIG. 2 is a vertical cross-sectional view showing a motor shaft, a rotor, and a bearing taken out from the wheel drive motor according to the embodiment.
Figure 3:
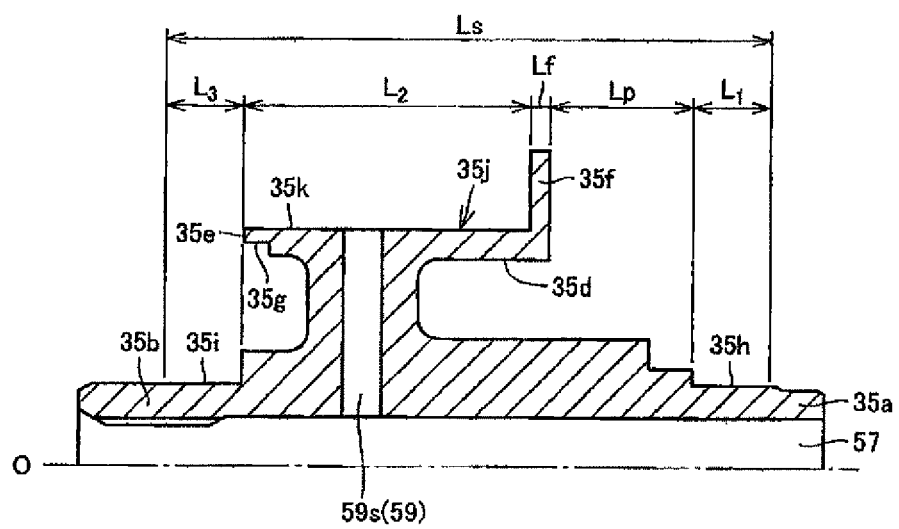
FIG. 3 is a vertical cross-sectional view showing the motor shaft taken out from the wheel drive motor according to the embodiment.

With reference to the accompanying drawings, an embodiment of the present invention will be described below. FIG. 1 is a vertical cross-sectional view of an in-wheel motor drive assembly adopting a wheel drive motor according to the embodiment of the present invention. FIG. 2 is a vertical cross-sectional view showing a motor shaft, a rotor, and a bearing taken out from FIG. 1. FIG. 3 is a vertical cross-sectional view showing the motor shaft taken out from FIG. 1. An in-wheel motor drive assembly 21 includes, as shown in FIG. 1, a motor section A that generates driving force, a speed reducing section B that reduces the rotational speed of the motor section A and outputs the reduced rotational speed, and a wheel hub bearing section C that transmits the output from the speed reducing section B to a driving wheel. The motor section A, speed reducing section B, and wheel hub bearing section C are coaxially aligned in this order in the direction of an axis O.

The motor section A is enclosed by a motor casing 22a, a pump casing 22p, a motor cover 22t, and a cover cap 22u, which form the contour of the motor section A. The speed reducing section B is housed in a speed reducing section casing 22b, which forms the contour of the speed reducing section B. The wheel hub bearing section C is a rolling bearing including a wheel hub 32 and a bearing outer ring 22c, which will be described later. The motor casing 22a, pump casing 22p, motor cover 22t, cover cap 22u, speed reducing section casing 22b, and bearing outer ring 22c are connected to one another to form a single casing 22. The in-wheel motor drive assembly 21 is installed in a wheel housing of, for example, an electric vehicle, with a wheel (not shown).

The motor section A is a radial gap motor including a stator 23 secured to an inner circumference of the hollow cylindrical motor casing 22a, a rotor 24 arranged so as to be opposed to the inner side of the stator 23 with a radial gap therebetween, and a motor shaft 35 that rotates together with the rotor 24. The motor section A can be an axial gap motor.

As shown in FIG. 2, the rotor 24 is made of a plurality of ring-shaped flat steel discs 24m stacked on top of each other in the direction of the axis O, and includes a pair of ring-shaped edge members 38 at the opposite ends of the rotor 24. The axially stacked steel discs 24m and edge members 38 form a hollow cylindrical body. The hollow cylindrical body is placed between a flange part 35f that is a part of the motor shaft 35 and a flange-like end member 39 fixedly attached to the motor shaft 35.

As shown in FIG. 1, the end member 39, one of the edge members 38, the plurality of steel discs 24m, the other edge member 38, and the flange part 35f are sequentially stacked from a first side (one side) to a second side (the other side) in the direction of the axis O and are transfixed by a long slender bolt 37 extending in parallel with the axis O. Specifically speaking, a female threaded hole is formed in the end member 39, while a small hole or a cutout is formed in one of the edge members 38, the steel discs 24m, the other edge member 38, and the flange part 35f. Since the bolt 37 is inserted from the flange part 35f, a head 37n of the bolt 37 projects out of the flange part 35f. The bolt 37 has a male thread end part along the outer surface, and is screwed in the female threaded hole formed in the end member 39. Thus, the end member 39, one of the edge members 38, the steel discs 24m, and the other edge member 38 are tightly secured to a large diameter portion 35d, which is a central part of the motor shaft 35 in the axial direction. The plurality of steel discs 24m and the pair of edge members 38 are compressed by the end member 39 and flange part 35f in the axial direction. Each of the edge members 38 has an end face that makes contact with the rotor 24, and, as shown in FIG. 2, a groove 59u extending in a radial direction is formed in both the end faces. The grooves 59u are covered by end faces of the rotor 24 to form a lubricating oil passage.

The motor casing 22a extends in the direction of the axis O of the motor shaft 35 as shown in FIG. 1. The pump casing 22p, which is formed at one end of the motor casing 22a in a single piece, is roughly in the shape of a circular plate with a center hole, and defines the boundary between one end of the motor section A in the direction of the axis O and the speed reducing section B, as well as rotatably supporting a first end part of the motor shaft 35 with a bearing 36b. The bearing 36b is a well-known rolling bearing having an outer ring member, an inner ring member, and a plurality of rolling elements, but is not limited thereto. The inner ring member of the bearing 36b fits with the outer circumferential surface of the first end part of the motor shaft 35 and is secured.

The pump casing 22p has an oil pump 51 at its center. In an end face of the pump casing 22p orienting toward the motor section A formed is an annular groove 22g. The annular groove 22g houses a stator coil 23c projecting from the stator 23 in the direction of the axis O. The pump casing 22p has a central portion 22i projecting toward the radially inner space of the hollow cylindrical rotor 24. The outer ring member of the bearing 36b is fixedly attached on the inner circumferential surface of a center hole formed in the central portion 22i.

The motor cover 22t, which is fixedly attached to the other end of the motor casing 22a, is roughly in the shape of a circular plate with a center hole, and serves as an end face of the motor section A at the other end of the motor section A in the direction of the axis O, as well as rotatably supporting a second end part of the motor shaft 35 with a bearing 36a. The motor cover 22t serves as an end portion of the motor section A as well as an end portion of the in-wheel motor drive assembly 21. The bearing 36a is a well-known rolling bearing having an outer ring member, an inner ring member, and a plurality of rolling elements, but is not limited thereto. The inner ring member of the bearing 36a fits with the outer circumferential surface of the second end part of the motor shaft 35 and is secured. The outer ring member of the bearing 36a is fixedly attached on the inner circumferential surface of the center hole formed in the motor cover 22t. A rotational speed sensor 34 is disposed at a position between the bearing 36a and rotor 24 in the direction of the axis O. The rotational speed sensor 34 (detecting object) is supported by a bracket 22v, which is a part of the motor cover 22t projecting toward the rotor 24, and faces a sensor rotor (detected object) mounted on the outer circumferential surface of the motor shaft 35. In addition, a cover cap 22u is attached to the motor cover 22t to seal the center hole of the motor cover 22t and to cover an end face of the motor shaft 35.

Referring to FIG. 2 showing the rotor 24 and motor shaft 35 in an enlarged scale, the motor shaft 35 includes small diameter portions 35a, 35b at its opposite end parts and a large diameter portion 35d at its central part. The small diameter portions 35a, 35 have a predetermined outer diameter, while the large diameter portion 35d is in the shape of a hollow cylinder and has a predetermined outer diameter sufficiently larger than that of the small diameter portions 35a, 35b.

The large diameter portion 35d is connected to the shaft part of the motor shaft 35 (the straight shaft part extending from the small diameter portion 35a to the small diameter portion 35b) with a coupling portion 35c extending radially inward from an axial central part of the large diameter portion 35d. The axially opposite ends of the large diameter portion 35d are cantilevered by the coupling portion 35c. At an end of the large diameter portion 35d located closer to the small diameter portion 35a, formed is the flange part 35f projecting radially outward. On the contrary, the end member 39 is fixedly attached to an end of the large diameter portion 35d located closer to the small diameter portion 35b.

The bearing 36b rotatably supports the small diameter portion 35b which is the first end part of the motor shaft 35. The bearing 36a rotatably supports the small diameter portion 35a which is the second end part of the motor shaft 35. An inner circumferential surface 24i of the rotor 24 fits with an outer circumferential surface 35j of the large diameter portion 35d which is the central part of the motor shaft 35. In the inner circumferential surface 24i of the rotor 24 formed is a groove, which is made of the continuously aligned cutouts formed in the inner circumference of the steel discs 24m, to avoid interference with the bolt 37. A groove 59t that forms a lubricating oil passage, which will be described later, is formed on the outer circumferential surface 35j. An end part 24p of the rotor 24 located on the first side in the axial direction projects over an end face 35e of the large diameter portion 35d located on the first side in the axial direction toward the side on which the small diameter portion 35b is. Consequently, the axial dimension Lr of the rotor 24 is greater than the axial dimension $L_2$ of the outer circumferential surface 35j. Therefore, it is possible to ensure a sufficient axial dimension Lr of the rotor 24 to generate satisfactory motor torque between the rotor 24 and stator 23. Note that the dimension Lr in FIG. 2 represents the axial length of an area interposed between the flange part 35f of the large diameter portion 35d and a flange part of the end member 39. In other words, in FIG. 2, the sum of the axial dimension of the rotor 24 itself and the axial dimension of radially inner parts of the pair of edge members 38 (parts with which the flange part 35f of the large diameter portion 35d and the flange part of the end member 39 make contact, respectively) represents the dimension Lr.

The outer diameter of the large diameter portion 35d, or the outer circumferential surface 35j, is sufficiently greater than the outer diameter of the small diameter portion 35b, and also sufficiently greater than the outer diameter of the bearing 3613. The axial position of the bearing 36b coincides with the axial position of the end part 24p of the rotor 24. This decreases the distance from the bearing 36b to the bearing 36a, thereby shortening the bearing span of the motor shaft 35, and further shortening the axial dimension of the motor section A.

Although the outer circumferential surface 35j, which is a face fitting with the rotor 24, is shorter than the rotor 24 in the axial direction, there is no problem in attaching the rotor since the end member 39 presses the end part 24p of the rotor 24 in the axial direction. In addition, one of the edge members 38 is placed away from the outer circumferential surface 35j, but there is no problem in attaching the edge member since the edge member is supported by the end member 39.

Referring to FIG. 3 showing the motor shaft 35 in an enlarged scale, the outer circumferential surface 35j of the large diameter portion 35d includes a large diameter portion's fitting surface that fits with the radially inner part of the rotor 24. The small diameter portion 35a includes on its outer circumference a small diameter portion's fitting surface 35h that fits with the inner ring member of the bearing 36a. The small diameter portion 35b includes on its outer circumference a small diameter portion's fitting surface 35i that fits with the inner ring member of the bearing 36b. The outer circumferential surface 35j serving as the large diameter portion's fitting surface is positioned axially next to the small diameter portion's fitting surface 35i, but does not coincide even in part. In a surface grinding process for the motor shaft 35, this layout allows a grindstone to grind the outer circumferential surface 35j and the small diameter portion's fitting surface 35i from a radially outward direction without rechucking the motor shaft 35, thereby performing a surface grinding process on the surfaces 35j and 35i at the same time.

Figure 6:
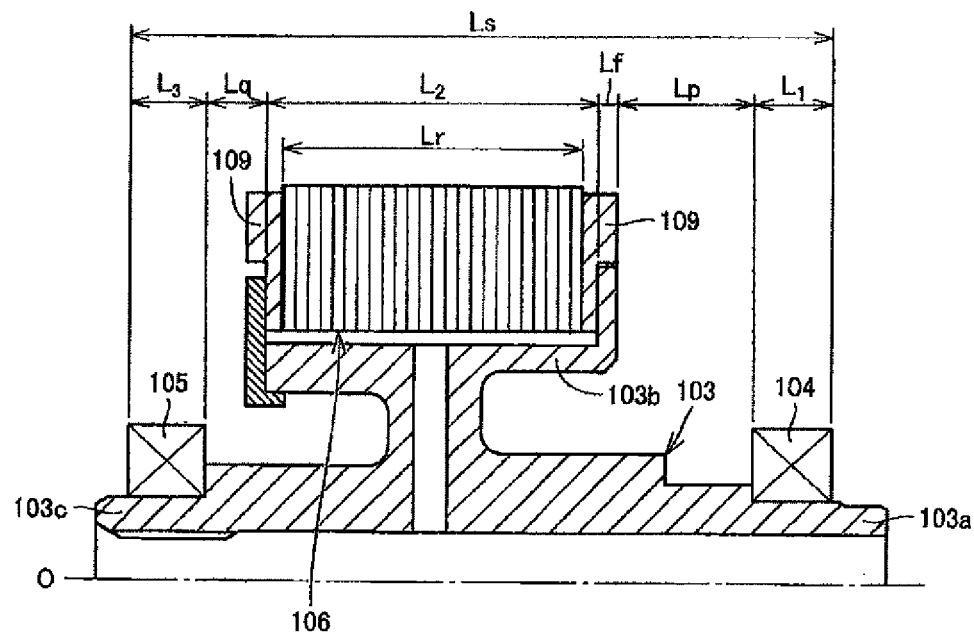
FIG. 6 is a vertical cross-sectional view showing a motor shaft, a rotor, and a bearing taken out from the conventional wheel drive motor.
Figure 7:
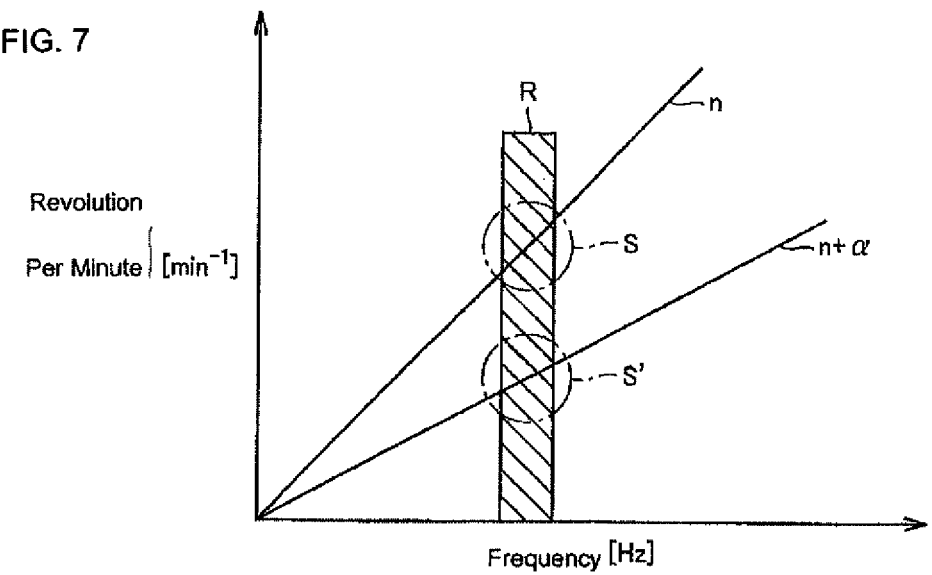
FIG. 7 is a graph showing the relationship between resonance frequency of a suspension device and the surroundings to which an in-wheel motor drive assembly is attached, and rotation n-th order forced components.

Especially, since the small diameter portion's fitting surface 35i and the outer circumferential surface 35j of the large diameter portion in this embodiment are located continuously in the axial direction, as shown by the axial dimensions $L_3$, $L_2$, the bearing span of the motor shaft can be made shorter than the conventional motor shaft. As shown in FIG. 6, the conventional motor shaft 103 is relatively long because a distance Lq is interposed between the bearing 105 and rotor 106.

Figure 4:
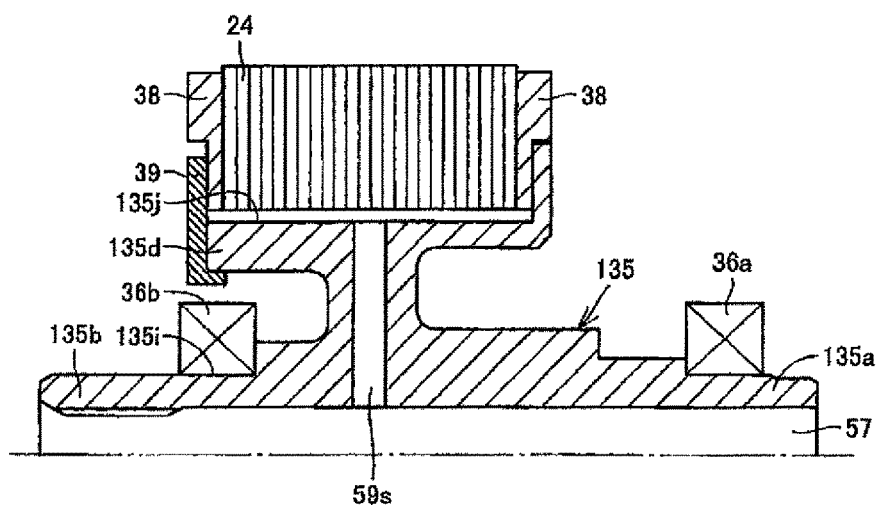
FIG. 4 is a vertical cross-sectional view showing a motor shaft, a rotor, and a bearing taken out from a wheel drive motor according to a comparative example.
Figure 5:
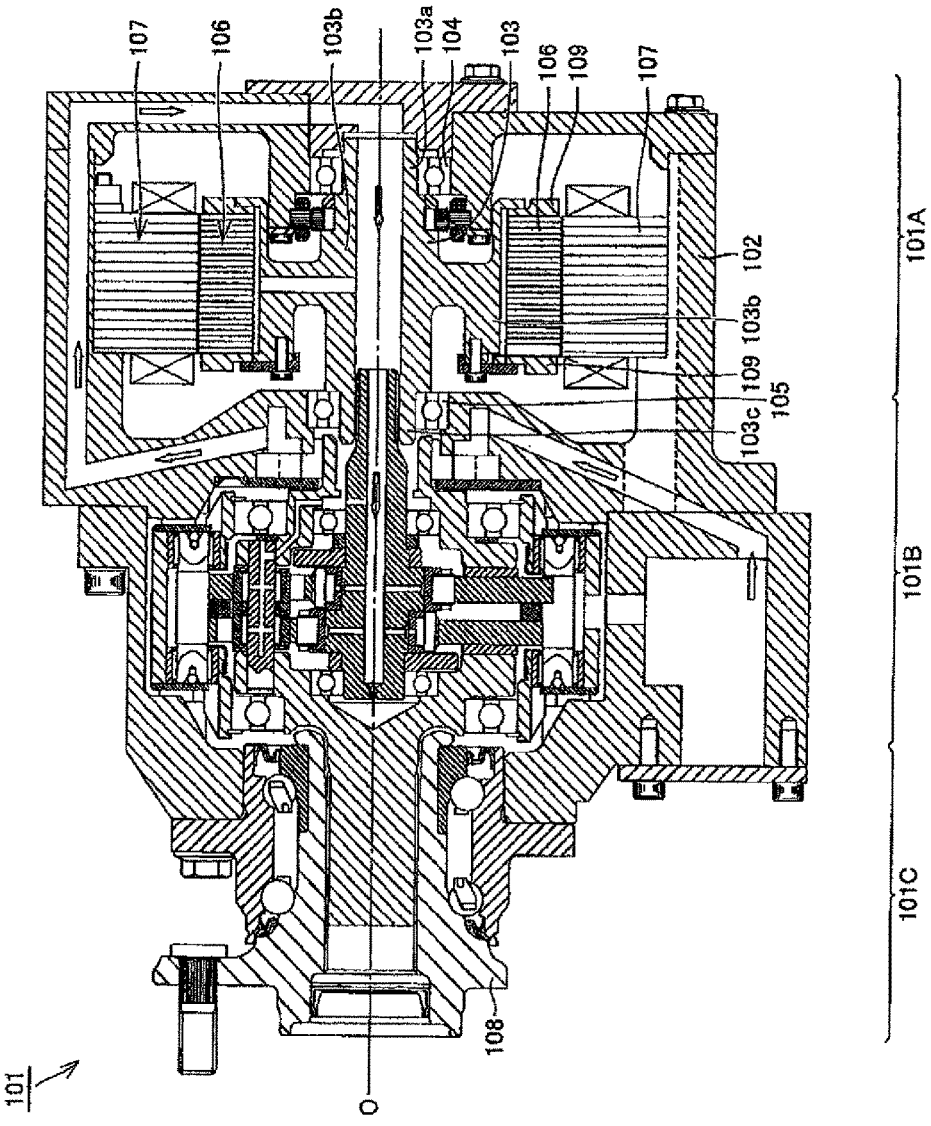
FIG. 5 is a vertical cross-sectional view of an in-wheel motor drive assembly adopting a conventional wheel drive motor.

In order to provide a deeper understanding of the embodiment, a comparative example is shown in FIG. 4. The motor shaft 135 of the comparative example has a large diameter portion's fitting surface 135j and a small diameter portion's fitting surface 135i, and their positions overlap with each other in the axial direction. The surface grinding process for the motor shaft 135 requires to chuck the motor shaft 135 to put a grindstone on the large diameter portion's fitting surface 135j from radially outward, and then to rechuck the motor shaft 135 to put the grindstone on the small diameter portion's fitting surface 135i. The two chucking operations inevitably cause shaft misalignment that may lead to a slight concentricity deviation between the large diameter portion's fitting surface 135j and the small diameter portion's fitting surface 135i, which is not preferable to keep them in balance.

Alternatively, for the motor shaft 135 according to the comparative example, it is possible to prepare a special grindstone having a projection insertable into the hollow-cylindrical large diameter portion 135d to grind the small diameter portion's fitting surface 135i; however, such a special grindstone drives up costs. In addition, such a grindstone with a projection is low in stiffness and therefore has disadvantages in machining accuracy.

As is obvious from the comparison with the motor shaft 135, the present embodiment as shown in FIG. 3 enables simultaneous grinding of the outer circumferential surface 35j and the small diameter portion's fitting surface 35i through a single chucking operation, thereby increasing the accuracy of the concentricity between the outer circumferential surface 35j and the small diameter portion's fitting surface 35i, and providing cost advantages.

Returning to FIG. 2, the end member 39 is fixedly attached to the end face 35e of the large diameter portion 35d, which is located on the first side in the axial direction, projects from the end face 35e in the axial direction, and extends radially outward like a flange. In other words, the end member 39 is opposed to the flange part 35f with the rotor 24 and the radially inner parts of the pair of edge members 38 interposed therebetween.

The end member 39 is a ring-shaped member composed of a hollow cylinder part and a flange part, and has an L-shaped cross section when it is cut along a plan including a central axis (axis O) (see FIG. 2). On an end part, located on the first side in the axial direction, of the large diameter portion 35d, a fitting surface 35g is formed with high accuracy so as to be concentric with the axis O of the motor shaft 35. When the fitting surface 35g, which is a circumferential surface, fits with an intended surface of the ring-shaped end member 39, the end member 39 is positioned to be concentric with the axis O. Although the fitting surface 35g in this embodiment is an inner circumferential surface and the intended surface of the end member 39 is an outer circumferential surface, the inner-outer relationship of the circumferential surfaces is interchangeable.

The end member 39 has an outer circumferential fitting surface 39j that fits with a radially inner part of the end part 24p of the rotor 24. The rotor 24 is positioned concentric with the axis O with high accuracy by making the radially inner part of the rotor 24 fit with the outer circumferential surface 35j and the outer circumferential fitting surface 39j. In addition, the outer circumferential fitting surface 39j fits with not only the inner circumferential surface 24i of the rotor 24, but also the inner circumferential surface of the one of the edge members 38. Thus, the edge member 38 is also positioned with high accuracy by the outer circumferential fitting surface 39j so that the rotor 24 is positioned concentric with the axis O. Likewise, the other edge member 38 is positioned with high accuracy by the outer circumferential surface 35j of the large diameter portion 35d so that the rotor 24 is positioned concentric with the axis O.

As shown in FIG. 1, one end of the motor shaft 35 is coupled to a speed reducing section's input shaft 25 that is provided rotatably in the speed reducing section B. The distal end of the speed reducing section's input shaft 25 with respect to the motor section A is rotatably supported by an end of a speed reducing section's output shaft 28, which will be described later, with a bearing 36d. The proximal end of the speed reducing section's input shaft 25 with respect to the motor section A is coupled to the end of the motor shaft 35. The central part of the speed reducing section's input shaft 25 is rotatably supported by a reinforcing member 61, which will be described later, with a bearing 36c. The bearings 36c, 36d are well-known rolling bearings each having an outer ring member, an inner ring member, and a plurality of rolling elements.

Eccentric portions 25a, 25b are formed on the outer circumference of the speed reducing section's input shaft 25 eccentrically from the axis O. The two eccentric portions 25a, 25b, in the shape of a disc, are located apart from each other in the direction of the axis O with a 180° phase shift in the circumferential direction for the purpose of canceling out vibrations caused by centrifugal force generated through eccentric motion thereof. The motor shaft 35 and speed reducing section's input shaft 25 make up a motor's rotational component used to transmit driving force from the motor section A to the speed reducing section B.

The speed reducing section B is a cycloid reducer that is disposed on one side of the motor section A in the direction of the axis O coaxial with the motor section A, and includes a hollow-cylindrical speed reducing section casing 22b, an outer-pin holding portion 45 that is secured to the speed reducing section casing 22b, a speed reducing section's input shaft 25, eccentric portions 25a, 25b that are coupled to the speed reducing section's input shaft 25, curved plates 26a, 26b that are revolution members rotatably held by the eccentric portions 25a, 25b, a plurality of outer pins 27 that are outer engagement members engaged with outer circumference parts of the curved plates 26a, 26b, a speed reducing section's output shaft 28, inner pins 31 that are inner engagement members coupled to the speed reducing section's output shaft 28 and inserted in holes formed in the curved plates 26a, 26b, a center collar 29 that is attached in a gap between the curved plates 26a and 26b and abuts against end faces of the curved plates 26a, 26b to prevent the curved plates 26a, 26b from tilting, and a reinforcing member 61. A rolling bearing 41 is provided in an annular space between the outer circumference of the eccentric portion 25a and the inner circumference of the curved plate 26a. In addition, a rolling bearing 41 is provided between the outer circumference of the eccentric portion 25b and the inner circumference of the curved plate 26b.

The speed reducing section's output shaft 28 includes a flange portion 28a on a side closer to the motor section A and a shaft portion 28b placed in the wheel hub bearing section C. The flange portion 28a has a circular recessed part at the center that receives one end of the speed reducing section's input shaft 25, and an outer ring member of the bearing 36d is fixedly attached on an inner circumferential surface of the circular recessed part. The flange portion 28a has an outer edge portion with holes equidistantly formed in the circumferential direction around the axis O of the speed reducing section's output shaft 28. Each of the holes secures one end of each inner pin 31. A wheel hub 32 is fixedly coupled on the outer circumferential surface of the shaft portion 28b. The speed reducing section's output shaft 28 and wheel hub 32 make up a wheel's rotational component that transmits driving force from the speed reducing section B to a driving wheel.

The outer pins 27 are equidistantly arranged in the circumferential direction around the axis O. During one revolution of the speed reducing section's input shaft 25, the curved plates 26a, 26b engaged with the outer pins 27 orbit around the axis O one time and also slightly rotate on their own axes in the opposite direction to the orbital motion in synchronization with the motion of the eccentric portions 25a, 25b. The inner pins 31 are inserted into the through holes formed in the curved plates 26a, 26b, and have a diameter substantially smaller than the diameter of the through holes. The inner pins 31 configured as above extract only the rotational motion of the curved plates 26a, 26b to transmit it to the speed reducing section's output shaft 28. The rotational frequency of the speed reducing section's output shaft 28 against the rotational frequency of the speed reducing section's input shaft 25 is reduced to more than 1/10. The speed reducing section B according to the embodiment can provide compactness and a high speed reduction ratio.

The other ends of the inner pins 31 further from the flange portion 28a are provided with a reinforcing member 61. The reinforcing member 61 includes a annular portion 61b that is in the shape of a flange and is coupled to the tips of the plurality of inner pins 31, and a tubular portion 61c that extends from the inner circumferential edge of the annular portion 61b toward the motor section A in the axial direction. A load applied from the two plates 26a, 26b to some of the inner pins 31 is distributed to all the inner pins 31 through the annular portion 61b, thereby reducing stress acted upon the inner pins 31 and increasing durability. The tip of the tubular portion 61c is inserted into an oil pump 51 to actuate the oil pump 51.

The oil pump 51, which is connected to an intake oil passage 52 and a discharge oil passage 54 formed in walls of the pump casing 22p, takes lubricating oil from an oil reservoir 53 provided in a lower part of the speed reducing section B through the intake oil passage 52, and discharges the lubricating oil from the discharge oil passage 54. The discharge oil passage 59 is sequentially connected to a cooling oil passage 55 that is formed in the motor casing 22a to cool down the lubricating oil, a connecting oil passage 56a formed in a wall of the motor cover 22t, a connecting oil passage 56b formed in a wall of the cover cap 22u, an axial oil passage 57 formed in the pipe-like motor shaft 35 and speed reducing section's input shaft 25 to extend along the axis O, a branch oil passage 58a formed in the speed reducing section B to extend from the axis O radially outward through the eccentric portion 25a, a branch oil passage 58b formed in the speed reducing section B to extend from the axis O radially outward through the eccentric portion 25b, and holes 43 pierced in the inner ring members 42 fitting with the outer circumferences of the eccentric portions 25a, 25b.

The lubricating oil discharged from the oil pump 51 sequentially flows through these passages 54, 55, 56a, 56b, 57, 58a (58b), and the holes 43 to lubricate the interior of the speed reducing section B (rolling bearings 91, curved plates 26a, 26b, inner pins 31, outer pins 27, bearings 36c, 36d, and other components). The used lubricating oil drops down and flows through a through hole 45h formed in a lower part of the outer-pin holding portion 45 and a through hole 53h formed in a lower part of the speed reducing section casing 22b to be collected in the oil reservoir 53 formed in a lower part of the speed reducing section casing 22b. Then, the lubricating oil is again sucked in by the oil pump 51 to circulate inside the in-wheel motor drive assembly 21.

As shown in FIG. 2, a rotor oil passage 59 is formed in the motor shaft 35 so as to branch off from the axial oil passage 57 and extend in the radial direction. The rotor oil passage 59 includes a hole 59s formed inside the coupling portion 35c so as to extend from the axial oil passage 57 radially outward, a groove 59t connected to the hole 59s, and grooves 59u extending from ends of the groove 59t radially outward. The radial outer ends of the grooves 59u are open. The lubricating oil flowing from the axial oil passage 57 into the rotor oil passage 59 is injected into the motor casing 22a to lubricate the interior of the motor section A (bearings 36a, 36b and other components). The used lubricating oil drops down, and flows through a through hole 53i pierced in a lower part of the pump casing 22p to be collected in the oil reservoir 53.

As described above, the in-wheel motor drive assembly 21 of this embodiment has a lubricating-oil circulating passage to implement a center shaft lubricating system, and injects the lubricating oil from the input shaft 25. Then, the lubricating oil flows from the input shaft 25 radially outward to lubricate the motor section A and speed reducing section B.

According to the embodiment, as shown in FIG. 2, the motor section includes the bearing 36b, which rotatably supports the small diameter portion 35b of the motor shaft 35 located on the first side in the axial direction, and the rotor 24, which is secured to the outer circumferential surface 35j of the large diameter portion 35d of the motor shaft 35 located on the second side (at the central part) in the axial direction and faces the stator, and the end part 24p of the rotor 24 projects over the end face 35e of the large diameter portion 35d located on the first side in the axial direction toward the side on which the small diameter portion 35b is, and thereby the axial dimension Lr of the rotor 24 can be made greater than the axial dimension $L_2$ of the outer circumferential surface 35j (Lr>$L_2$). Thus, necessary motor torque can be ensured for driving the wheel. In addition, as shown in FIG. 3, the shaft length Ls of the motor shaft 35 can be shortened in comparison with the conventional motor shaft, and therefore the bearing span can be made shorter than that of the conventional motor.

Now, FIG. 3 showing the motor shaft 35 of this embodiment is compared with FIG. 6 showing the conventional motor shaft 103. The shaft length Ls of the motor shaft 35 is the sum of the axial dimension $L_1$ of the bearing 36a, the distance Lp from the bearing 36a to the flange part 35f, the thickness Lf of the flange part 35f, the axial dimension $L_2$ of the outer circumferential surface 353, and the axial dimension $L_3$ of the bearing 36b. On the other hand, the shaft length Ls of the motor shaft 103 is expressed by Ls=$L_3$+Lq+$L_2$+Lf+Lp+$L_1$. As a result, it is found that the motor shaft 35 of this embodiment is shorter than the conventional motor shaft 103 by a length Lq. In addition, the axial dimension Lr of the conventional rotor 106 is smaller than the axial dimension Lr of an outer circumferential surface of the motor shaft 103 to which the rotor 106 and a pair of edge members 109 are fixedly attached, and therefore full use of the axial dimension $L_2$ has not been made.

Note that the dimension Lr in FIG. 6 represents the axial dimension of the rotor 106 alone. If the dimension Lr is supposed to represent the sum of the axial dimension of the rotor 106 and the axial dimension of the radially inner parts of the pair of edge members 109, the dimension Lr of the conventional rotor 106 is roughly equal to the axial dimension $L_2$ of the outer circumferential surface of the central part (large diameter portion) 103b of the motor shaft 103.

According to the embodiment, as shown in FIG. 2, the outer diameter of the large diameter portion 35d is greater than the outer diameter of the bearing 361), and the axial position of the bearing 36b overlaps with the axial position of the end part 24p of the rotor 24. Thus, the axial dimension Lr of the rotor 24 can be sufficiently ensured, while the shaft length of the motor shaft 35 can be still shortened.

According to the embodiment, as shown in FIG. 3, the outer circumferential surface 35*j* of the large diameter portion 35*d* includes the large diameter portion's fitting surface 35*k* that fits with the radially inner part of the rotor 24, and the small diameter portion 35*b* has on its outer circumference a small diameter portion's fitting surface 35*i* that fits with the inner ring member of the bearing 36*b*. Besides, the large diameter portion's fitting surface 35*k* and the small diameter portion's fitting surface 35*i* are adjacent to each other in the axial direction, but do not coincide with each other. This layout allows the outer circumferential surface 35*j* and the small diameter portion's fitting surface 35*i* to be ground together in a grinding process of the motor shaft 35, thereby providing a highly accurate concentric motor shaft 35. In this embodiment, the large diameter portion's fitting surface 35*k* and small diameter portion's fitting surface 35*i* are positioned adjacent to each other in the axial direction such that the position of an end, located on the first side in the axial direction, of the large diameter portion's fitting surface 35*k* (outer circumferential surface 35*j*) roughly coincides with the position of an end, located on the second side in the axial direction, of the small diameter portion's fitting surface 35*i*; however, this is merely an example, and the large diameter portion's fitting surface 35*k* and small diameter portion's fitting surface 35*i* may be positioned slightly apart from each other in the axial direction. In other words, there is no problem if the large diameter portion's fitting surface 35*k* and small diameter portion's fitting surface 35*i* is positioned adjacent to each other in the axial direction such that at least the axial position of the small diameter portion's fitting surface 35*i* overlaps with the axial position of the end member 39. More specifically, there is no problem if the end of the small diameter portion's fitting surface 35*i* on the second side in the axial direction is positioned within a range defined by the end of the large diameter portion's fitting surface 35*k* on the first side in the axial direction and an end of the end member 39 on the first side in the axial direction.

According to the embodiment, the end member 39, which is fixedly attached to the large diameter portion 35*d* so as to project in the axial direction from an end face of the large diameter portion 35*d* on the first side in the axial direction and cover an end face of the rotor 24 on the first side in the axial direction, restricts the axial position of the rotor 24 to prevent the rotor 24 from deviating in the axial direction.

According to the embodiment, the end member 39 is positioned by the fitting surface 35*g* of the large diameter portion 35*d* so as to be coaxial with the axis O of the motor shaft 35, and has the outer circumferential fitting surface 39*j* that fits with a radially inner part of the end part 24*p* of the rotor 24. Thus, the rotor 24 is positioned to be concentric with the axis O with high accuracy.

According to the embodiment, the edge member 38 provided between the end member 39 and the end face of the rotor 24 located on the first side in the axial direction has the groove 59*u* through which lubricating oil flows, thereby lubricating the motor section A. The edge member 38 does not need to be provided to either one of the spaces between the rotor 24 and end member 39 and between the rotor 24 and the flange part 35*f* of the large diameter portion 35*d*.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents.

INDUSTRIAL APPLICABILITY

The wheel drive motor and in-wheel motor drive assembly according to the present invention are advantageously used in electric vehicles and hybrid vehicles.

REFERENCE SIGNS LIST 21 in-wheel motor drive device
22 casing
22*a* motor casing
22*g* annular groove
22*i* central portion
22*p* pump casing
22*t* motor cover
22*u* cover cap
23 stator
23*c* stator coil
24 rotor
24*i* inner circumferential surface
24*m* steel disc
24*p* end part
25 speed reducing section's input shaft
28 speed reducing section's output shaft
35*f* flange part
32 wheel hub
35 motor shaft
35*a*, 35*b* small diameter portion
35*c* coupling portion
35*d* large diameter portion
35*e* end face
35*h*, 35*i* small diameter portion's fitting surface
35*j* outer circumferential surface
35*k* large diameter portion's fitting surface
36*a*, 36*b*, 36*c*, 36*d*, 41 bearing
37 bolt
37*n* nut
38 edge member
39 end member
39*j* outer circumferential fitting surface
51 oil pump
52 intake oil passage
53 oil reservoir
59 rotor oil passage
59*s* hole (lubricating oil passage)
59*t*, 59*u* groove (lubricating oil passage)
Lf thickness of flange part
Ls minimum shaft length of motor shaft
O axis

The invention claimed is:
1. A wheel drive motor, comprising:
a motor shaft, for outputting drive force to rotate a wheel, extending in an axial direction and including a large diameter portion located at a central part in the axial direction and a small diameter portion located on a first side in the axial direction, the small diameter portion having a diameter smaller than that of the large diameter portion,
a bearing rotatably supporting the small diameter portion, and
a rotor secured to an outer circumferential surface of the large diameter portion and facing a stator, an end member that is fixedly attached to the large diameter portion, projects from the end face of the large diameter portion located on the first side in the axial direction, and covers an end face of the rotor located on the first side in the axial direction, wherein an end part of the rotor located on the first side in the axial direction projects over an end face of the large diameter portion located on the first side in the axial direction toward a side having the small diameter portion, and further wherein the end member is positioned to be coaxial with the motor shaft at an attachment position on the large diameter portion, and the end member includes an outer circumferential fitting surface that fits with a radially inner part of the end part of the rotor located on the first side in the axial direction.

2. The wheel drive motor according to claim 1, wherein the large diameter portion has an outer diameter greater than the outer diameter of the bearing, and the end part of the rotor projects over an end part of the bearing located on a second side in the axial direction toward the side having the small diameter portion.

3. The wheel drive motor according to claim 2, wherein the outer circumferential surface of the large diameter portion includes a large diameter portion's fitting surface that fits with a radially inner part of the rotor, the small diameter portion has a small diameter portion's fitting surface on its outer circumference, the small diameter portion's fitting surface fitting with an inner ring member of the bearing, and the positions of the large diameter portion's fitting surface and the small diameter portion's fitting surface are adjacent to each other so as not to overlap with each other in the axial direction.

4. A wheel drive motor, comprising:

a motor shaft, for outputting drive force to rotate a wheel, extending in an axial direction and including a large diameter portion located at a central part in the axial direction and a small diameter portion located on a first side in the axial direction, the small diameter portion having a diameter smaller than that of the large diameter portion, a bearing rotatably supporting the small diameter portion, and a rotor secured to an outer circumferential surface of the large diameter portion and facing a stator, an end member that is fixedly attached to the large diameter portion, projects from the end face of the large diameter portion located on the first side in the axial direction, and covers an end face of the rotor located on the first side in the axial direction, an edge member that is interposed between the end member and the end face of the rotor located on the first side in the axial direction, and includes a lubricating oil passage, wherein an end part of the rotor located on the first side in the axial direction projects over an end face of the large diameter portion located on the first side in the axial direction toward a side having the small diameter portion.

5. An in-wheel motor drive assembly comprising:

a wheel drive motor according to claim 1, a speed reducing section including an input shaft coupled to the motor shaft and an output shaft reducing the rotational speed of the input shaft and outputting it, and a wheel hub bearing section including a wheel hub coupled to the output shaft.

6. The wheel drive motor according to claim 4, wherein the large diameter portion has an outer diameter greater than the outer diameter of the bearing, and the end part of the rotor projects over an end part of the bearing located on a second side in the axial direction toward the side having the small diameter portion.

7. The wheel drive motor according to claim 6, wherein the outer circumferential surface of the large diameter portion includes a large diameter portion's fitting surface that fits with a radially inner part of the rotor, the small diameter portion has a small diameter portion's fitting surface on its outer circumference, the small diameter portion's fitting surface fitting with an inner ring member of the bearing, and the positions of the large diameter portion's fitting surface and the small diameter portion's fitting surface are adjacent to each other so as not to overlap with each other in the axial direction.

8. An in-wheel motor drive assembly comprising:

a wheel drive motor according to claim 4, a speed reducing section including an input shaft coupled to the motor shaft and an output shaft reducing the rotational speed of the input shaft and outputting it, and a wheel hub bearing section including a wheel hub coupled to the output shaft.

* * * * *